United States Patent Office

Re. 28,173
Reissued Sept. 24, 1974

28,173

RADIATION TREATMENT OF HALOGEN CONTAINING OLEFINICALLY UNSATURATED ESTERS

Matthias Marx, Bad Durkheim, Albrecht Zosel, Ludwigshafen (Rhine), Herbert Spoor and Heinz Pohlemann, Limburgerhof, and Dieter Heinze, Neckaregemund, Germany, assignors to Badische Anilin- & Soda-Fabrik Aktiengesellschaft, Ludwigshafen (Rhine), Germany No Drawing. Original No. 3,627,659, dated Dec. 14, 1971, Ser. No. 743,033, July 8, 1968. Application for reissue June 22, 1973, Ser. No. 372,472
Claims priority, application Germany, July 11, 1967, P 17 20 283.4
Int. Cl. B01j *1/00;* C08d *1/00*
U.S. Cl. 204—159.22 3 Claims

Matter enclosed in heavy brackets [ ] appears in the original patent but forms no part of this reissue specification; matter printed in italics indicates the additions made by reissue.

ABSTRACT OF THE DISCLOSURE

A process for the production of coatings, impregnations or bonds by polymerization and cross-linking of mixtures containing olefinically unsaturated esters containing halogen by means of ionizing radiation.

This invention relates to a process for the production of cross-linked polymers by the action of high-energy radiation on substantially solvent-free polymerizable systems. The process serves in particular for the production of coatings, impregnations and bonds.

Methods for polymerization by means of high-energy radiation are already known, high-energy radiation being the range of wave and corpuscular radiation usually so termed in the literature (cf. for example Rexer-Wuckel, "Chemische Veranderungen von Stoffen durch energiereiche Strahlung" (Chemical changes brought about in substances by high-energy radiation) Leipzig 1965). The radiation sources in the methods which are of industrial interest are usually electron generators having accelerating potentials of more than 300 up to 500 kilovolts. The possibilities of using this process for curing lacquers are however very limited. Since the electrons move away from the accelerator in straight lines, only flat articles can be treated in a single passage. In irradiation of geometrically intricate articles, a plurality of accelerators having different radiation directions are required for continuous operation. Even then portions of the surface lying in the radiation shadow are not reached or are only reached inadequately because the depth of penetration of free electrons into the solid at the said accelerating potentials is of the order of magnitude of 1 mm. and therefore the carrier material of the layer of lacquer is not irradiated through in the case of conventional accelerating equipment. Increasing the accelerating potential for the production of electron beams having very much higher penetrating power is impracticable for economic considerations.

Narrow limits are also placed on the prior art methods by the lacquer raw materials. Since conventional lacquer raw materials used in such methods only cure satisfactorily within relatively narrow ranges of radiation intensity, zones of different degrees of cure are formed when uneven lacquered surfaces are irradiated because of the different distances from the discharge aperture of the accelerator and according to the angle of incidence of the radiation.

The object of this invention is to provide a type of binder for coating, impregnating or bonding agents which are curable by means of high-energy radiation, the said binder type being satisfactorily curable with relatively small doses of radiation but tolerating a considerable excess beyond these minimal dosages. The requirements as regards hardness, gloss, toughness, bond strength, and resistance to chemical reagents and solvents which are made according to the state of the art on the coatings, impregnations and bonds obtained should at least be fulfilled.

We have now found that cross-linked polymers can be prepared with particular advantage by irradiating systems containing olefinically unsaturated polymerizable monomers with high-energy radiation by using polymerizable monomers which consists to the extent of 10 to 90 percent, preferably from 20 to 70 percent, by weight of polymerizable esters containing halogen. In the preferred embodiment, monomers substantially free from solvents are irradiated.

Particularly suitable polymerizable esters which contain halogen and particularly chlorine and/or bromine are esters of $\alpha$, $\beta$-unsaturated polymerizable carboxylic acids with chlorinated and/or brominated alcohols, for example esters of bromoisopropyl alcohol, 2-bromoethanol, 1,2-dibromopropanol, trichloronitroisopropanol, 2,2,3-trichlorobutanol, 3,4-dibromobutanol-1, 2-chloroisobutyl alcohol, chlorotrimethyl carbinol, 3,3,4-trichloropentanol-(2), and 3-bromo-2-methylbutanol-(2) with acrylic acid, crotonic acid, methacrylic acid, cinnnamic acid, fumaric acid, maleic acid, itaconic acid, citraconic acid, dihydromuconic acid, oleic acid, palmitolic acid and the like. Particularly suitable ethylenically unsaturated carboxylic acids are those having three to six carbon atoms.

Esters of halogen-containing alcohols of the said type, of halogen-free alcohols and of alcohols containing functional groups such as carbon-carbon double bonds, nitro groups and the like, with polymerizable acids containing halogen, particularly those having three to six carbon atoms, are also suitable, for example esters of 2-chloroacrylic acid - (1)- 3-chloroacrylic acid-(1), 3,3-dichloroacrylic acid-(1), 2,3-dichloroacrylic acid-(1), trichloroacrylic acid, 2 - bromoacrylic acid - (1), 2,3-dichloro-3-bromoacrylic acid - (1), 2 - chlorocrotonic acid-(1), 3-chlorocrotonic acid - (1), 2-bromocrotonic acid-(1), 3-chloro-2-ethylcrotonic acid-(1), 2-bromoundecene-(2[z]) acid-(11), palmitolic acid diiodide, bromocitraconic acid, chlorocitraconic acid, dibromodihydromuconic acid, dichlorohydromuconic acid, chloromesaconic acid, bromomesaconic acid, dibromomaleic acid, dichloromaleic acid, monochloroitaconic acid, dichloroitaconic acid, 2-chlorocinnamic acid, 3 - chlorocinnamic acid and 4-chlorocinnamic acid.

Esters of unsaturated halogen-containing alcohols with saturated or unsaturated, mainly organic acids, for example the esters of acetic acid, chloroacetic acid and the like, with 2-chloroallyl alcohol, are also suitable.

In some cases it may be advantageous to use, in admixture with the said esters, halogen compounds different from the esters; besides free halogen-substituted olefinically unsaturated polymerizable acids, for example compounds such as acrylyl chloride, methacrylyl chloride, crotonyl chloride, 2-[chlorocrontonyl] *chlorocrotonyl* chloride-(1), cinnamyl chloride, oleyl chloride, citraconyl dichloride, dichloromaleyl dichloride, cinnamic gamma-bromopropylamide, and trichloroacrylamide.

The systems cross-linked by irradiation may contain (in addition to the said compounds) from 10 to 90 percent, preferably from 30 to 80 percent, by weight of other polymerizable compounds. These may be as a rule olefinically unsaturated monomers used in conventional free-radical initiated polymerizations, particularly esters of acrylic or methacrylic acid with alcohols having one to eight carbon atoms, vinylbenzenes such as styrene or vinyltoluene, nitriles of unsaturated carboxylic acids having three to six carbon atoms such as methacrylonitrile and acrylonitrile, vinyl esters of aliphatic monocarboxylic acids having two to eight carbon atoms, such as vinyl acetate, vinyl propionate and vinyl pivalate, and olefins, particularly higher olefins such as n-hexene and 4-methylpentene-(1).

Improvement in the hardness, elasticity and solvent resistance of the polymers prepared by irradiation can be achieved in a preferred embodiment of the process by the coemployment of compounds having a plurality of polymerizable double bonds. Examples of these, in addition to 1-chloroallyl acrylate which has already been mentioned, are compounds such as allyl esters or N-allylamides of ethylenically unsaturated carboxylic acids having three to six carbon atoms, or their oligomers or low molecular weight polymers, e.g. allyl acrylate, allyl methacrylate, and N-allylacrylamide, or low molecular weight acrylic polymers of such monomeric compounds, diesters or diamides of aliphatic diols or triols or diaminoalkanes and ethylenically unsaturated carboxylic acids having three to six carbon atoms, e.g. ethylene glycol diacrylate, triethylene glycol diacrylate, hexamethylene bisacrylamide di- or polyallyl esters of di- or polycarboxylic acids having three to eight carbon atoms, e.g. diallyl terephthalate or diallyl phthalate, triacryloformal, triallyl cyanurate, and the like. These polyfunctional polymerizable compounds may make up an amount of up to 80 percent by weight of the system capable of being polymerized by irradiation, but as a rule the amount is from 5 to 50 percent by weight.

The addition of minor amounts, particularly of up to about 15 percent by weight, preferably up to 5 percent by weight (with reference to the total of the other monomers), of conventional molecular weight regulators (mercaptans, CH-acid compounds such as acetoacetic esters, saturated compounds containing halogen such as bromoform and carbon tetrachloride, aldehydes such as propionaldehyde and acrolein, and the like) often results in polymers which are better cross-linked and consequently more resistant to solvents.

The systems may if desired contain further additives, for example pigments, soluble dyes, optical brighteners, plasticizers, agents for promoting flow and gloss, chemical polymerization initiators (such as peroxides or azo compounds) or aging retardants. In particular they may contain polymerized compounds, for example conventional lacquer binding agents such as alkyl resins, aminoplast resins, phenolic resins, epoxy resins, colophony resins, drying oils, nondrying oils, cellulose derivatives, polyacrylates, polymethacrylates and the like, particularly in an amount of from 5 to 30 percent by weight with reference to the monomers.

Curing of the polymerizable systems according to the invention may be carried out with electron rays having an energy of more than 0.1 megavolts and with X-rays and gamma-rays, i.e. electromagnetic radiation in the wavelength range of from $10^{-6}$ to $10^{-12}$ cm. Curing takes place in a surprisingly high degree even when air is present independently of the radiation dosage and of the dose rate, so that in contrasts to prior art methods the risk of overexposure is practically nonexistent. With small doses of radiation of from about 1 to 3 Mrad at irradiation periods of 10 to 20 minutes up to high doses of more than 20 to 30 Mrad with short irradiation periods (0.5 to 5 seconds), completely nontacky, hard, elastic and highly glossy coatings can be obtained. Doses of 1 to 10 Mrad at dose rates of about 1 to about 10 Mrad/second are preferred. It is advantageous to choose small thicknesses of coating layer (e.g. from 50 microns down to less than 1 micron). It is also possible however to completely cure relatively thick coatings or lacquers, e.g. in the range of 50 to 500 microns. Irradiation curing of the systems is preferably carried out at temperatures of from 0° to 150° C. and particularly from 10° to 80° C.

It is possible according to the process of the invention for example to provide metal articles with a cured lacquer coating all around, even in hidden places, in a single operation, for example by dip-coating them followed by moving them past a [course] *source* of gamma-rays or X-rays.

The polymerizable systems may be applied to any solid substrates, for example by spraying, brushing, pouring, rolling, knife-coating, flooding, dipping or impregnation. The said systems are especially suitable for the production of coatings, lacquerings, bonds and impregnations.

The invention is illustrated by the following examples. The parts specified in the examples are by weight.

EXAMPLE 1

A film having a thickness of 50 microns is drawn from a mixture of 7 parts of 2,3-dibromopropyl acrylate and 3 parts of tetra-(allyloxymethyl)-acetylenediurea by means of film-drawing equipment onto a deep-drawing metal sheet and irradiated with an electron beam at 2 megavolts accelerating potential with a dose of 12 Mrad at a dose rate of 19 Mrad per minute. A nontacky glossy hard coating is obtained which adheres very well. Its elasticity according to DIN 53, 156 is 5.4.

EXAMPLE 2

A deep-drawing metal sheet having a thickness of 0.7 mm. is coated on both sides by dipping it in a mixture of 3 parts of 2,3-dibromopropyl acrylate and 3 parts of tetra-(allyloxymethyl)-acetylenediurea and then exposed in the air at 30 C. to X-ray irradiation (anode: gold, potential: 120 kilovolts). At a dose rate of 0.1 Mrad per minute an irradiation period of 20 minutes is necessary to obtain both on the side of the sheet facing the radiation source and on the opposite side a hard, glossy, elastic and well-adhering solvent-resistant coating.

EXAMPLE 3

A mixture of 8 parts of tricyclodecenyl acrylate and 2 parts of 2,3-dichloropropyl acrylate is sprayed onto a deep-drawing metal sheet with a spray gun and irradiated for 2 minutes with an electron beam at an accelerating potential of 2 megavolts and a dose rate of 6 Mrad per minute. A nontacky hard colorless glossy film is obtained which does not dissolve in the usual solvents.

EXAMPLE 4

A deep-drawing metal sheet having a thickness of 0.7 mm. is coated on both sides by dipping it in a mixture of 2.5 parts of 2,3-dibromopropyl alpha-chloroacrylate, 0.5 part of triethylene glycol diacrylate and 3 parts of tetra-(allyloxymethyl)-acetylenediurea and then exposed in the air at 35° C. to X-ray irradiation (potential: 120 kilovolts; anode: gold). At a dose rate of 0.1 Mrad per minute an irradiation period of 20 minutes is required to obtain a hard, well-adhering and solvent-resistant coating both on the side of the sheet facing the radiation source and on the opposite side.

EXAMPLE 5

A film having a thickness of 60 microns is drawn from a mixture of 80 parts of 3a,4,5,6,7,7a-hexahydro-4,7-methanoindenyl acrylate-(5), 10 parts of 2,3-dichloro-3-bromoacrylic acid-(1) and 10 parts of 2-chloroallyl acrylate by means of film-drawing equipment onto a plywood board and irradiated with an electron beam at an accelerating potential of 2 megavolts with a dose of 6 Mrad at a dose rate of 18 Mrad per minute. A glossy nontacky hard coating is obtained.

EXAMPLE 6

The 30 percent solution of a copolymer prepared from 50 parts of butanediol acrylate acetylacetate, 43 parts of methyl methacrylate and 7 parts of n-butyl acrylate in a mixture of 12 parts of 2-chlorocrotonyl chloride-(1), 20 parts of 2,3-dichloropropyl acrylate and 68 parts of triallyl cyanurate is applied in a layer 50 microns in thickness to a deep-drawing metal sheet by knife-coating and irradiated with an electron beam at an accelerating potential of 2 megavolts with a dose of 12 Mrad at a dose rate of 18 Mrad per minute. A nontacky hard glossy insoluble coating is obtained.

We claim:

1. A process for the production of cross-linked polymers by irradiating with doses of high-energy radiation of from 1 to 30 Mrad at an irradiation period of from 0.5 seconds to 20 minutes a system containing (a) tetra-(allyloxymethyl)-acetylenediurea, and (b) [2,3-dibromopropyl acrylate.] *10 to 90% by weight, with reference to the sum of (a) and (b), of esters of α,β-unsaturated polymerizable carboxylic acids having three to six carbon atoms with chlorinated or brominated alcohols.*

2. A process as in claim 1 wherein high-energy radiation dose is from 1 to 3 Mrad and the irradiation period is from 10 to 20 minutes.

3. A process as in claim 1 wherein the high-energy radiation dose is from 20 to 30 Mrad at an irradiation period of from 0.5 to 5 seconds.

References Cited

UNITED STATES PATENTS

| | | | |
|---|---|---|---|
| 3,255,163 | 6/1966 | Gobran et al. | 260—89.5 |
| 3,213,072 | 10/1965 | Hoffenberg et al. | 260—89.5 |
| 2,921,006 | 1/1960 | Schmitz et al | 204—159.22 |

R. B. TURER, Assistant Examiner

U.S. Cl. X.R.

117—93.31; 204—159.15; 260—70, 71, 78.5 BB, 78.5 UA, 80.72, 80.73, 80.76, 80.81, 89.7, 86.1 R, 86.1 N, 836, 847, 851, 853.